US011877328B2

(12) United States Patent
Patil et al.

(10) Patent No.: US 11,877,328 B2
(45) Date of Patent: Jan. 16, 2024

(54) SYSTEM AND METHOD FOR ENCODING OF LOCAL BANDWIDTH CONDITIONS INTO TUNNELING MESSAGE

(71) Applicant: Verizon Patent and Licensing Inc., Basking Ridge, NJ (US)

(72) Inventors: Sudhakar Reddy Patil, Flower Mound, TX (US); James Mathison, Warren, NJ (US); Jignesh S. Panchal, Hillsborough, NJ (US); Ratul K. Guha, Warwick, PA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/931,263

(22) Filed: Sep. 12, 2022

(65) Prior Publication Data

US 2023/0014126 A1 Jan. 19, 2023

Related U.S. Application Data

(63) Continuation of application No. 16/911,587, filed on Jun. 25, 2020, now Pat. No. 11,483,882.

(51) Int. Cl.
*H04W 76/12* (2018.01)
*H04W 76/11* (2018.01)
*H04W 28/08* (2023.01)
*H04M 15/00* (2006.01)

(52) U.S. Cl.
CPC .......... *H04W 76/12* (2018.02); *H04M 15/66* (2013.01); *H04W 28/0925* (2020.05); *H04W 28/0967* (2020.05); *H04W 76/11* (2018.02)

(58) Field of Classification Search
CPC ............... H04W 28/096; H04W 76/11; H04W 28/0925; H04W 76/12; H04W 36/14; H04W 36/18; H04W 36/005
See application file for complete search history.

(56) References Cited

U.S. PATENT DOCUMENTS

2007/0127444 A1* 6/2007 Gras .................... H04W 36/12
370/356
2017/0026151 A1 1/2017 Adachi
2017/0118622 A1 4/2017 Jiang \* cited by examiner

*Primary Examiner* — Anez C Ebrahim

(57) ABSTRACT

A method, a system, and a non-transitory storage medium provide for encoding a general packet radio service (GPRS)-tunnel endpoint identifier (GTP-TEID) with data identifying radio frequency (RF) bandwidths supported in a local radio environment (LRE) from which a user equipment (UE) device accesses the wireless access station; sending, via a signaling channel, the GTP-TEID to a core network device; notifying one or more core network devices of an RF bandwidth category level corresponding to the RF bandwidths; and applying at least one of a policy rule or a charging rule to a packet data unit (PDU) session for the UE device, based on the RF bandwidth category level.

20 Claims, 6 Drawing Sheets

UL TUNNEL INFO AT CORE NETWORK:

GTP TUNNEL IP ADDRESS
104

GTP PORT NUMBER
106

GTP TEID
108

DL TUNNEL INFO OF ACCESS STATION:

GTP TUNNEL IP ADDRESS
114

GTP PORT NUMBER
116

GTP TEID
118

US 11,877,328 B2

SYSTEM AND METHOD FOR ENCODING OF LOCAL BANDWIDTH CONDITIONS INTO TUNNELING MESSAGE

RELATED APPLICATION

This patent application is a continuation of U.S. patent application Ser. No. 16/911,587 filed Jun. 25, 2020 titled "SYSTEM AND METHOD FOR ENCODING OF LOCAL BANDWIDTH CONDITIONS INTO TUNNELING MESSAGE" the disclosure of which is hereby incorporated by reference herein in its entirety.

BACKGROUND

Radio access networks (RANs), in both standalone (SA) and non-standalone (NSA) architectures, may provide wireless services using a combination of radio frequency (RF) bands. For example, different markets in a geographic region may use different combinations of RF bands based on the amount of spectrum that is allocated for each RF band in a particular market. In some scenarios, RF bands are combined in carrier aggregation and/or in a dual connectivity model to meet user equipment (UE) performance metrics such as accessibility, congestion, latency, throughput, etc. Various core network elements associated with a RAN may not be informed of the RF bandwidths that support the RAN, for example, on a per bearer or a flow basis.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A Fifth Generation (5G) new radio (NR) network may provide standalone and non-standalone configurations. For example, for a non-standalone configuration, a Long Term Evolution (LTE) Evolved Packet Core (EPC) may be used, and for a standalone configuration, a 5G core (5GC) network may be used. Additionally, for example, for non-standalone service, an LTE sub-6 cell (e.g., below 6 Gigahertz (GHz)) may be an anchor cell (e.g., Master Cell Group (MCG)) that provides control signaling, and an NR band may be a secondary cell (e.g., Secondary Cell Group (SCG)) that provides (additional) data service. For standalone service, an NR band may provide control signaling and data service.

The RF bands that support a 5G network may vary to include certain ranges, such as above 6 GHz and below 6 GHz, as well as other frequency ranges, such as sub-3 (e.g., below 3 GHz), mid-band (e.g., between 3 GHz and 6 GHz), low band, millimeter wave (mmWave), and so forth. The respective RF propagation properties are such that a coverage provided by a lower RF band is larger than a coverage provided by a higher RF band. RF bands may also have significant discrepancies relative to uplink (UL) and downlink (DL) coverage areas based on differences in transmit power and receiver capability (e.g., antenna array, noise figure, etc.) between UE and RAN devices (e.g., evolved Node B (eNB), next generation Node B (gNB), etc.). Therefore, one local radio environment (LRE) within a RAN may be supported by a particular combinations of RF bands while another LRE, near or distant to the first LRE, but within the same RAN, may be supported by a different combination of RF bands.

Information regarding the RF bandwidths supported or available in an LRE, on a per bearer and flow basis, is not currently communicated from the RAN to the core network. As such, the appropriate quality of service (QoS), charging and traffic policies, etc., may not be employable by the core network. For example, "low" bandwidth conditions in a local area may not support providing high capacity 4 k content (e.g., video streaming), whereas "high" bandwidth conditions may support providing high capacity 4 k content. Similar issues arise in a cell type or presence reporting area information on a per bearer and flow basis. As network configurations evolve and available RF spectrum is added, challenges arise concerning optimal usage of the RF footprint and a corresponding service coverage. Implementations, as described herein, communicate bandwidth conditions at dedicated radio bearer (DRB) level granularity for use in policy control and charging scenarios.

Figure 1A:
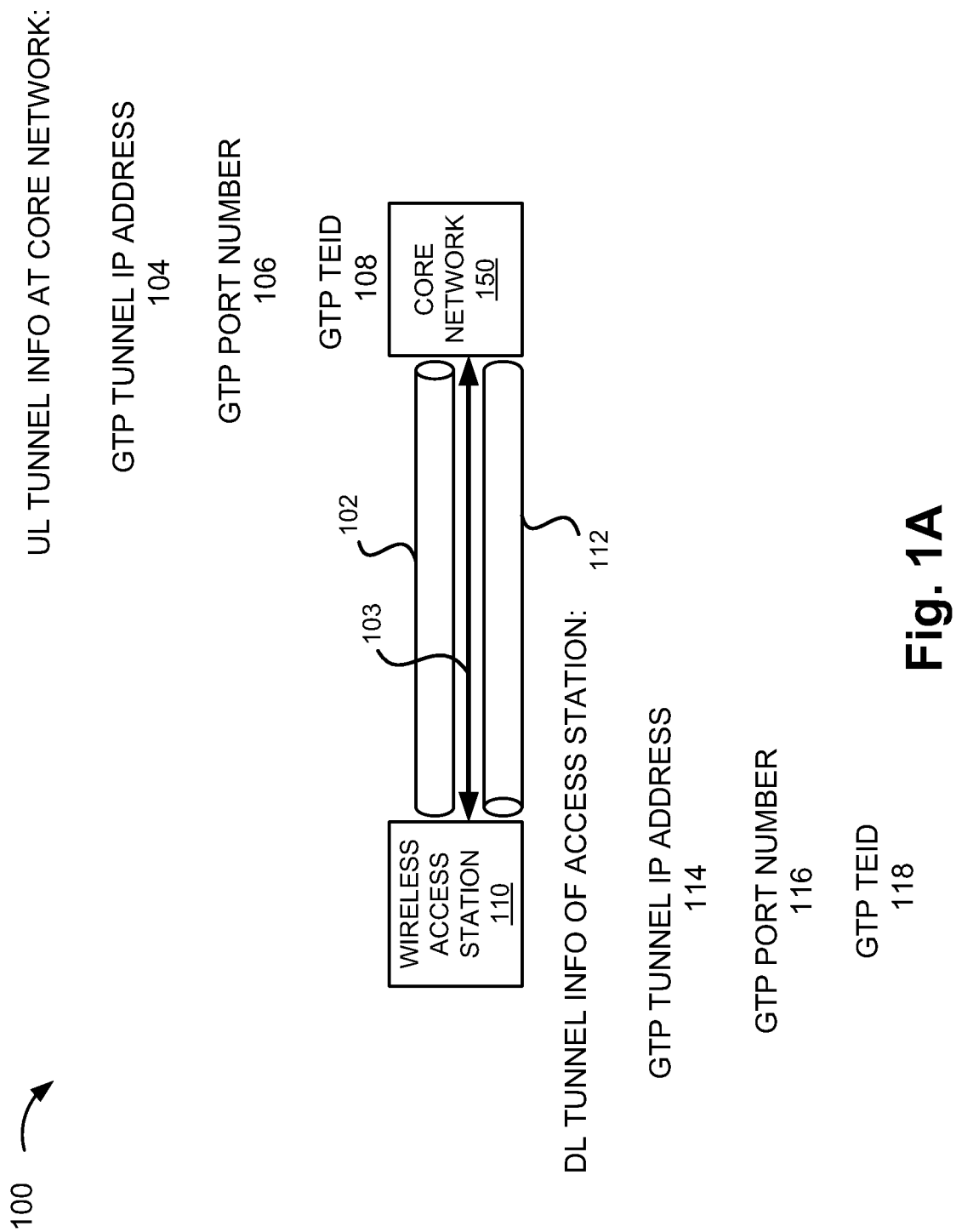
FIGS. 1A-B are diagrams illustrating an exemplary environment in which an exemplary embodiment of the encoding of tunnel messaging system may be implemented.

FIG. 1A is a diagram illustrating a portion of exemplary environment 100 in which an exemplary embodiment of the encoding of tunnel messaging system may be implemented. According to exemplary embodiments, an encoding of tunnel messaging system is provided that enables a RAN to inform a core network of local bandwidth possibilities and conditions. In one implementation, the local bandwidth possibilities and conditions may be communicated at the same time as RAN resources are allocated for a flow, for example, at the time of sending radio resource control (RRC) reconfiguration to a UE device 115. The encoding system may be implemented using a general packet radio service (GPRS) tunneling protocol (GTP) user plane (GTPv1-U). According to an exemplary embodiment, a logical uplink (UL) tunnel 102 between a wireless access station 110 (e.g., gNB, eNB, etc.) and a core network 150 (e.g., user plane function (UPF), packet gateway (PGW), etc.) may be identified by a GTP tunnel IP address 104, a GTP port number 106, and a GTP-tunnel endpoint identifier (TED) 108. According to an exemplary embodiment, a logical downlink (DL) 112 tunnel between wireless access station 110 (e.g., gNB) and core network 150 may be identified by a GTP tunnel IP address 114, a GTP port number 116, and a GTP-TEID 118. The messaging system may include encoding GTP-TEID 118 with an extension identifying local bandwidth possibilities and conditions at a flow or a DRB level.

According to an exemplary embodiment, once core network 150 receives GTP-TEID 118 via a control plane signaling channel 103, a session management function (SMF) device of the core network may analyze the encoded information and generate a presence reporting area (PRA)

report to other elements of the core network. For example, a policy function (PF) device and/or a charging function (CHF) device may select QoS, a network slice identifier (ID), charging, traffic management, data shaping, and/or other policies based on the local bandwidth conditions and/or cell type identified in the PRA.

Figure 1B:
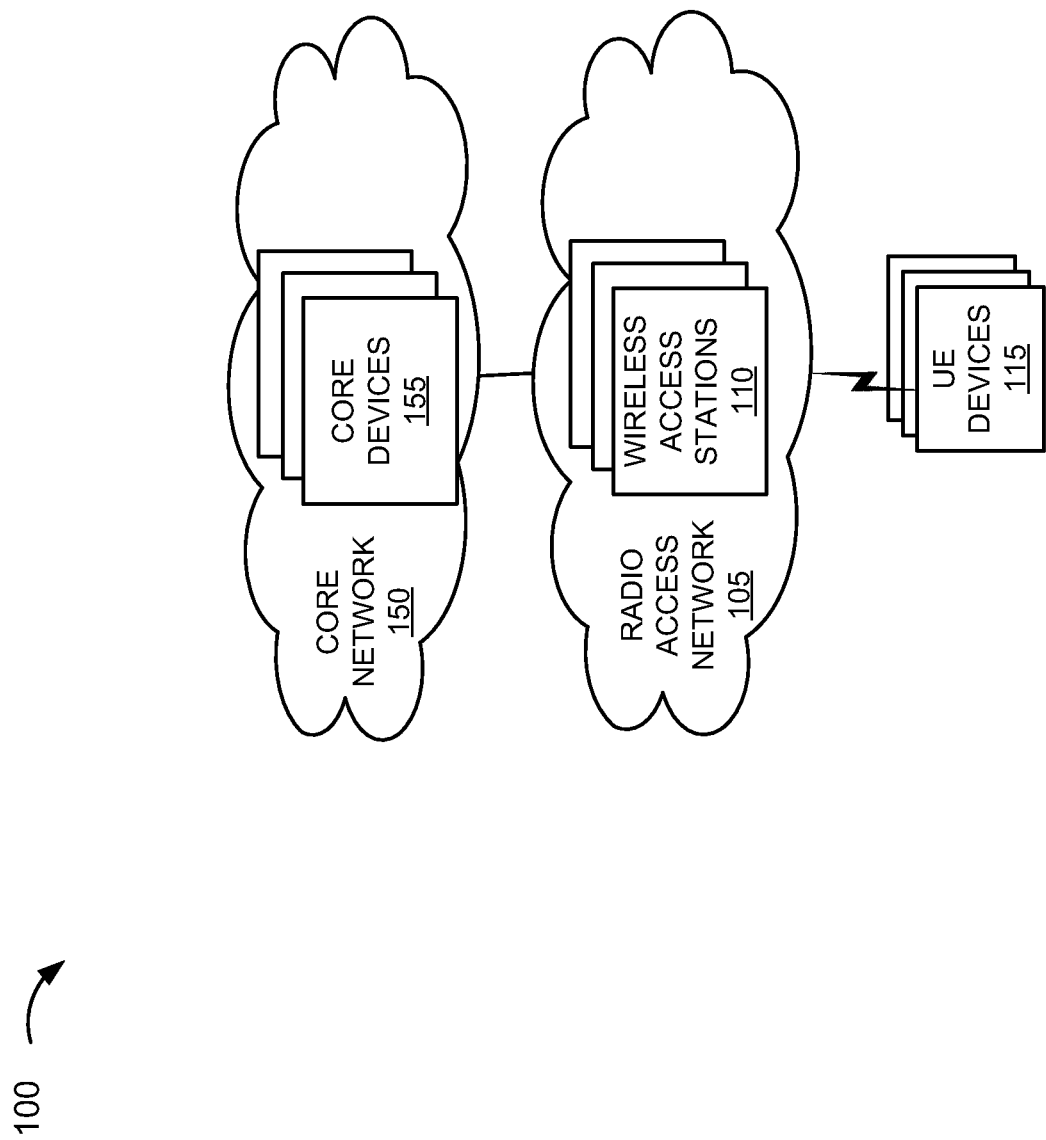

FIG. 1B is a diagram illustrating a portion of exemplary environment 100 in which an exemplary embodiment of the encoding of tunnel messaging system may be implemented. As illustrated, environment 100 includes a radio access network (RAN) 105, and core network 150. RAN 105 includes access devices 110, and core network 150 includes core devices 155. Environment 100 further includes UE devices 115.

The number, type, and arrangement of networks illustrated in environment 100 are exemplary. Additionally, or alternatively, other networks not illustrated in FIG. 1B may be included in environment 100, such as a backhaul network, a fronthaul network, an application layer network, or another type of intermediary network.

The number, the type, and the arrangement of network devices in RAN 105, and core network 150, as illustrated and described, are exemplary. The number of UE devices 115 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between UE device 115 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1B. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the encoding of tunnel messaging system may use at least one of these planes of communication. According to various exemplary implementations, the interface of the network device may be a service-based interface, a reference point-based interface, an Open RAN (O-RAN) interface, or some other type of interface.

RAN 105 may include one or multiple networks of one or multiple types and technologies. For example, RAN 105 may be implemented to include a next generation RAN (e.g., a Fifth Generation (5G)-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). RAN 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, O-RAN Reference Architecture, a virtualized RAN (vRAN), a self-organizing network (SON), etc.). RAN 105 may include a wired network, an optical network, or another type of network that may provide communication with core network 150, for example.

RAN 105 may include different and multiple functional splitting, such as options 1, 2, 3, 4, 5, 6, 7, or 8 that relate to combinations of RAN 105 and core network 150 including an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex systems (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR, standalone E-UTRA, etc.), etc.).

In an exemplary embodiment of the encoding of tunnel messaging system, environment 100 includes a split gNB that may include multiple gNB-distributed units (DUs) connected to a gNB-centralized unit (CU) connected to core network 150. For example, the gNB-DUs may support multiple different carriers and bandwidths. The gNB-CU and the gNB-DUs may be connected using F1-U and NG-U interfaces. As an alternative to a split gNB scenario, the system may be similarly applicable to an Option 3x, split-eNB case (e.g., via a W1 interface), or alternatively, for a connection to an evolved packet core (EPC)/5G core interworking.

Referring again to FIG. 1B, RAN 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, RAN 105 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, NR low band, NR mid-band, NR high band, etc.), and/or other attributes of radio communication.

Depending on the implementation, RAN 105 may include one or multiple types of network devices, such as access stations 110. For example, access stations 110 may include a next gNB, an eNB, an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device, another type of wireless node (e.g., a WiMax device, a hotspot device, etc.) that provides a wireless access service. According to some exemplary implementations, access devices 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include a 5GC network (also known as NGC network) (or other type of a future generation network), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an access and mobility management function (AMF), a session management function (SMF), a unified data management (UDM) device, a unified data repository (UDR) device, an authentication server function (AUSF), a network slice selection function (NSSF), a network repository function (NRF), a policy control function (PCF), a network data analytics function (NWDAF), a network exposure function (NEF), a lifecycle management (LCM) device, and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

UE device 115 includes a device that has computational and wireless communicative capabilities. Depending on the implementation, UE device 115 may be a mobile device, a portable device, a stationary device, a device operated by a user (e.g., UE, etc.), or a device not operated by a user (e.g., an Internet of Things (IoT) device, etc.). For example, UE device 115 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. UE device 115 may be configured to execute various types of software (e.g., applications, programs, etc.). The number and the types of software may vary among UE devices 115.

Figure 2:
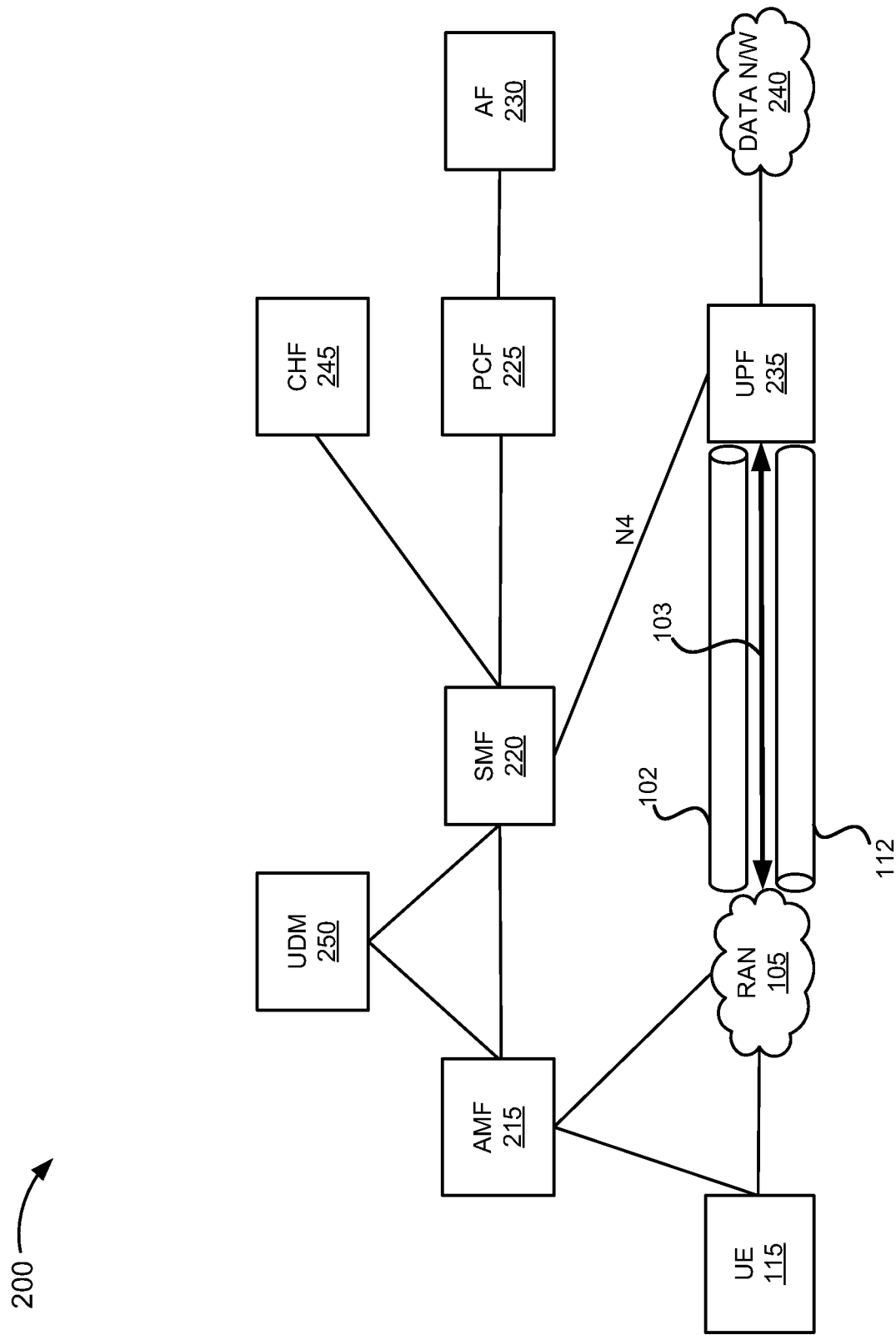
FIG. 2 is a diagram illustrating an exemplary process of an exemplary embodiment of the encoding of tunnel messaging system.

FIG. 2 illustrates an example environment 200, in which one or more embodiments, described herein, may be implemented. Environment 200 may be a 5G network, and/or may include elements of a 5G network. As shown in FIG. 2, environment 200 may include UE device 115, RAN 105, an AMF 215, an SMF 220, a policy control function (PCF) 225, an application function (AF) 230, a UPF 235, a data network (DN) 240, a CHF 245, and a UDM 350.

The number of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

AMF 215 may include one or more computation and communication devices that perform operations to register UE device 115 with the 5G network, to establish bearer channels associated with a session with UE device 115, to hand off UE device 115 from the 5G network to another network, to hand off UE device 115 from the other network to the 5G network, and/or to perform other operations. In some embodiments, the 5G network may include multiple AMFs 215, which communicate with each other via an interface.

SMF 220 may include one or more network devices that gather, process, store, and/or provide information in a manner described herein. SMF 220 may, for example, facilitate in the establishment of communication sessions on behalf of UE device 115. In some embodiments, the establishment of communications sessions may be performed in accordance with one or more policies provided by PCF 225. As described herein, SMF 220 may also monitor parameters associated with traffic sent to and/or received from UE device 115. For instance, SMF 220 may monitor resources consumed by UE device 115 (e.g., voice call minutes used, amounts of data sent and/or received, quantities of messages (e.g., SMS, MMS, and/or other types of messages) sent and/or received, or the like). SMF 220 may perform the monitoring by, for example, communicating with UPF 235 (e.g., via an interface) regarding user plane data that has been processed by UPF 235. As described herein, SMF 220 may receive information regarding usage and reporting rules (URRs) applied to traffic by one or more UPFs 235, in order to accurately track and calculate the actual usage of data that is handled by UPFs 235.

PCF 225 may include one or more devices that aggregate information to and from the 5G network and/or other sources. PCF 225 may receive information regarding policies and/or subscriptions from one or more sources, such as subscriber databases and/or from one or more users (such as, for example, an administrator associated with PCF 225). AF 230 may include one or more devices that receive, store, and/or provide information that may be used in determining parameters (e.g., quality of service parameters, charging parameters, or the like) for certain applications. AF 230 may maintain the information on a per-application basis, in some embodiments. CHF device 245 may track resource usage associated with UE device 115 in the telecommunications system as reported by UPF 235 for billing purposes.

UPF 235 may include one or more devices that receive, store, and/or provide data (e.g., user plane data). For example, UPF 235 may receive user plane data (e.g., voice call traffic, data traffic, etc.), destined for UE device 115, from DN 240, and may forward the user plane data toward UE device 115 (e.g., via RAN 105, SMF 220, and/or one or more other devices). In some embodiments, multiple UPFs 235 may be deployed (e.g., in different geographical locations), and the delivery of content to UE device 115 may be coordinated via an interface. Similarly, UPF 235 may receive traffic from UE device 115 (e.g., via RAN 105, SMF 220, and/or one or more other devices), and may forward the traffic toward DN 240. In some embodiments, UPF 235 may communicate (e.g., via an N4 interface) with SMF 220, regarding user plane data processed by UPF 235. As mentioned above, this information may aid SMF 220 in monitoring (e.g., tracking, counting, etc.) the traffic for particular subscribers. As described herein, UPF 235 may, as part of a packet data unit (PDU) session setup, prepare resources and generate a PDU session resource setup response that includes UL tunnel information.

DN 240 may include one or more wired and/or wireless networks. For example, DN 240 may include an Internet Protocol (IP)-based PDN, a wide area network (WAN) such as the Internet, a private enterprise network, and/or one or more other networks. UE device 115 may communicate, through DN 240, with data servers, application servers, other UE devices 115, and/or to other servers or applications that are coupled to DN 240. DN 240 may be connected to one or more other networks, such as a public switched telephone network (PSTN), a public land mobile network (PLMN), and/or another network. DN 240 may be connected to one or more devices, such as content providers, applications, web servers, and/or other devices, with which UE device 115 may communicate.

UDM 250 may include one or more devices that manage, update, and/or store, in one or more memory devices associated with UDM 250, profile information associated with a subscriber. UDM 250 may perform authentication, authorization, and/or accounting operations associated with the subscriber and/or a communication session with UE device 115.

Figure 3:
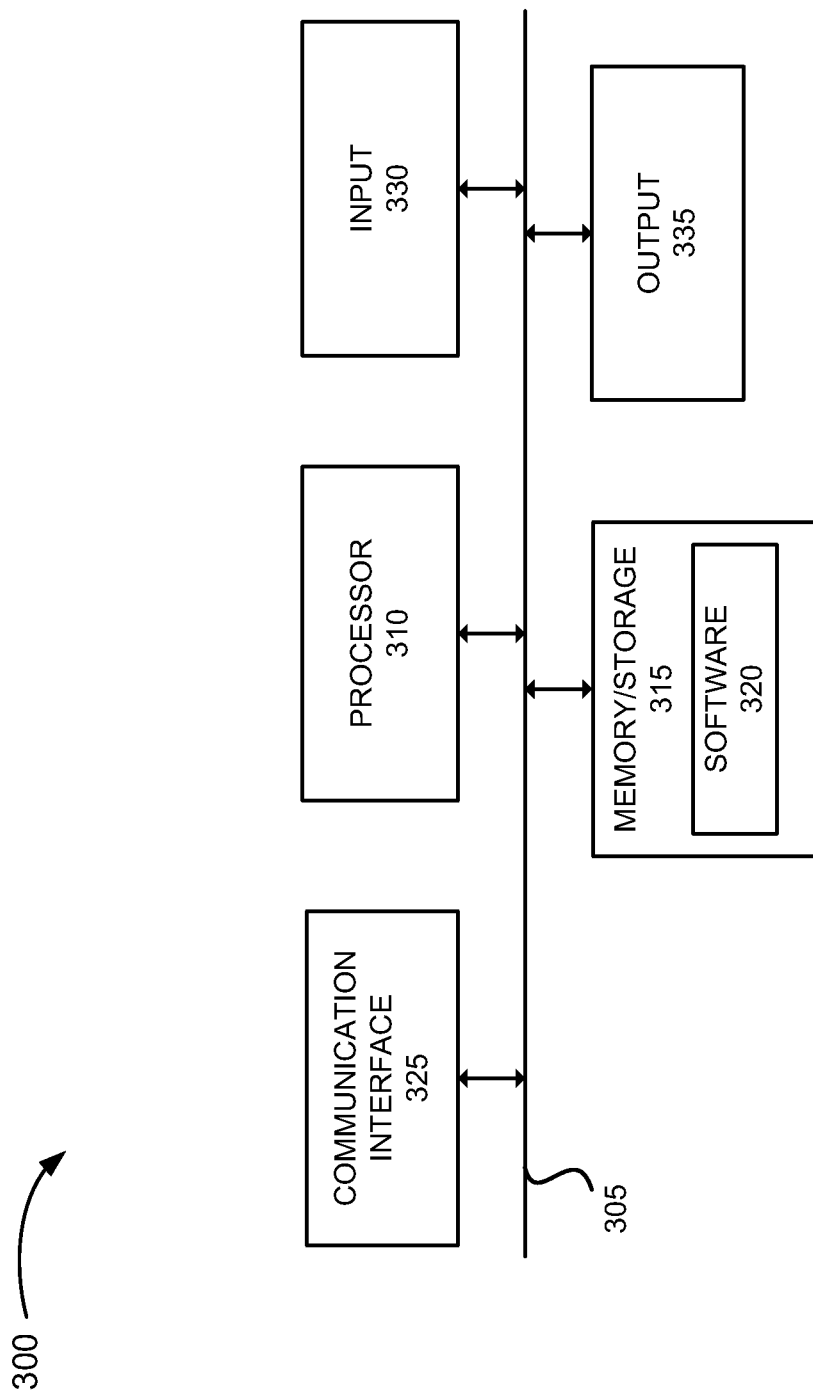
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to UE devices 115, access stations 110, core devices 155, AMF 215, SMF 220, PCF 225, AF 230, UPF 235, CHF 245, UDM 250, and other types of network devices or logic, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, etc.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing units (NPUs), and/or some other type of component that interprets and/or executes instructions and/or data. Processor 310 may be implemented as hardware (e.g., a microprocessor, etc.), a combination of hardware and software (e.g., an SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to access station 110, software 320 may include an application that, when executed by processor 310, provides a function of the encoding of the tunneling messages system, as described herein. Additionally, for example, with reference to UE device 115, software 320 may include an application that, when executed by processor 310, provides a function of the encoding of the tunneling messages system. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service-based interface, etc., as previously described.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process and/or a function, as described herein. Alternatively, for example, according to other implementations, device 300 performs a process and/or a function as described herein based on the execution of hardware (processor 310, etc.).

Figure 4:
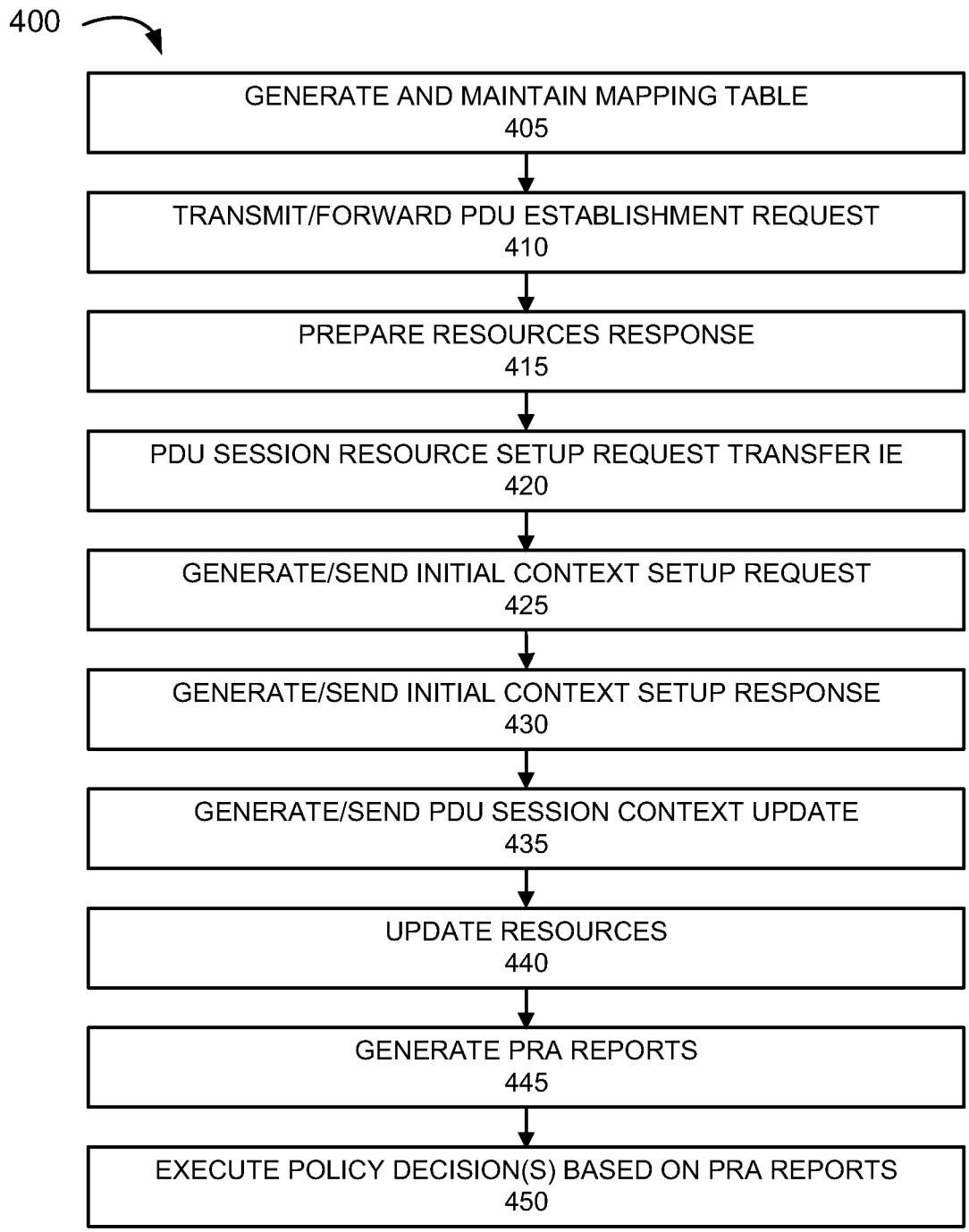
FIG. 4 is a flow diagram illustrating an exemplary process of an exemplary embodiment of the encoding of tunnel messaging system.

FIG. 4 is a flow diagram illustrating an exemplary process 400 of an exemplary embodiment of the encoding of tunnel messaging system. According to an exemplary embodiment, wireless access station 110, SMF device 220, UPF device 235, and/or AMF device 215 may perform steps of process 400. According to an exemplary implementation, processor 310 may execute software 320 to perform a step illustrated in FIG. 4 and described herein. Alternatively, a step illustrated in FIG. 4 and described herein, may be performed by execution of only hardware. According to an exemplary environment, process 400 may be performed in a multi-RAT RAN (e.g., a 5G-RAN and an E-UTRAN) and associated multi-core complementary networks, as illustrated and described herein.

FIG. 4 will be described with reference to FIG. 5, a messaging and operations diagram illustrating an exemplary embodiment of the encoding of tunnel messaging system.

Referring to FIG. 4, in block 405, a mapping table may be generated and maintained which maps RF bandwidth category levels to a set of presence reporting areas (PRAs) that define a coverage area within a network. For example, SMF 220 may obtain a mapping table 505 (FIG. 5) that maps a "high" RF bandwidth condition to PRA 10000001, and maps other levels of RF bandwidth conditions (e.g., low, medium, and/or other nomenclature) to PRAs of other values.

In block 410, UE device 115 may send a PDU session establishment request 510 via wireless access station 110, for example, in response to a user of UE device 115 activating/requesting an application service, which may be routed to AMF device 215. AMF device 215 may forward the PDU session establishment request 515 to SMF device 220. In block 415, SMF device 220 and UPF device 235 may prepare a resources response 520 that includes UL tunnel information. For example, the UL tunnel info may include a GTP tunnel IP (e.g., 10.1.1.11), a GTP port ID (e.g., 2152), and/or a GTP TEID (e.g., 0x00000010). In block 420, SMF device 220 may send a PDU session resource setup request transfer information element (IE) 525 to AMF device 215, for example, using an N1 container and an N2 container including the UL tunnel info. In block 425, AMF device 215 may send an initial context setup request 530 including the N1 and N2 containers to wireless station 110 (e.g., eNB).

In block 430, wireless access station 110 may generate and send an initial context setup response 535 to AMF device 215. For example, wireless access station 110 may use DL tunnel information such as a GTP tunnel IP (e.g., 10.1.1.12), a GTP port ID (e.g., 2152), and/or GTP TEID (e.g., 0x00000001). In one implementation, the GTP TEID may include multiple (e.g., two or more) octets of data, and wireless access station 110 may configure one of the octets to include RF bandwidth supported at the location of UE 115, as well as other types of information. An exemplary octet with exemplary attributes, values ranges, and values is shown in Table 1 below.

TABLE 1

| Attribute | Value Ranges | Values (# of Bits) |
| --- | --- | --- |
| Sector Bandwidth | 40-200, 201-600, 600+ MHz | 0, 1, 2 (2) |
| Highest Band | Sub-3, C-Band, mm Wave | 0, 1, 2 (2) |
| Device Category | 1-5, 6-11, 12-16, 16+ | 0, 1, 2, 3 (2) |
| Device RF | Near, Mid, Far, Cell-edge | 0, 1, 2, 3 (2) |

As shown in Table 1, an exemplary octet associated with an LRE and UE device 115 may include bits (e.g., two least significant) that are encoded for indicating sector bandwidth information, bits (e.g., next two least significant) that are encoded for indicating the highest band supported, bits (e.g., next two least significant) that are encoded for indicating a device category associated with UE device 110, and bits (e.g., two most significant) that are encoded for indicating the device RF associated with UE device 110 at the LRE. In this example, "sector bandwidth" supported in the LRE may be categorized into three nominal value ranges (e.g., 40-200 MHz, 201-600 MHz, 600+MHz), corresponding to three extension bit values (e.g., 0, 1, 2). Other ranges are possible. The "highest band" supported in the LRE may be categorized into three nominal values (e.g., sub-3, C-band, mmWave), corresponding to three extension bit values (e.g., 0, 1, 2). Other nominal values are possible. The "device category" for UE device 115 may be categorized into four nominal values (e.g., 1-5, 6-11, 12-16, 16+) corresponding to four extension bit values (e.g., 0, 1, 2, 3). Other nominal values are possible. The "device RF" for a relative position in the LRE may be categorized into four nominal values (e.g., near, mid, far, cell-edge), corresponding to four extension bit values (e.g., 0, 1, 2, 3). Other nominal values are possible.

In some embodiments, other LRE attribute information such as latency values may be encoded. Additionally or alternatively, a Reference Signal Received Power (RSRP) value, a Reference Signal Received Quality (RSRQ) value, a Received Signal Strength Indication (RSSI) value, a signal-to-interference-plus-noise ratio (SINR) value, a signal to noise ratio (SNR) value, a block error rate (BLER) value, an amplifier gain setting value, a channel state information (CSI) report (including, e.g., Channel Quality Indicator (CQI), Precoding Matrix Indicator (PMI), Rank Indicator (RI), etc.), and/or another type of signal characteristic value may be encoded.

In block 435, AMF device 215 may generate and send a PDU session context update 540 that includes the DL tunnel information, including the encoded GTP TEID, to SMF device 220. In block 440, SMF device 220 and UPF device 235 may update resources 545 using the encoded GTP TED. SMF device 220 may analyze the encoded GTP TEID and compare the various values with respect to the local bandwidth conditions, cell type, and UE device 115 characteristics, to corresponding values in the PRA mapping table. Based on the comparison, SMA device 220 may generate one or more PRA reports (block 445) to send to one or more elements of core network 140. For example, SMA device 220 may send one PRA report 550 to PCF 225 and another PRA report 560 to CHF 245. In block 450, PCF device 225 may use the PRA report 550 to execute one or more corresponding policy decisions 555 (e.g., QoS policies, traffic shaping policies, etc.), and/or CHF device 245 may use the PRA report 560 to execute one or more corresponding charging rules 565. The selected policies may be applied to the PDU session for UE 115 accessing the network via wireless access network 110, and may be repeated, for example, when UE device 115 is handed off to another wireless access network 110.

FIG. 4 illustrates an exemplary process 400 of the encoding of GTP TEIDs in a 5G system, however, according to other embodiments, process 400 may include additional operations and/or different operations than those illustrated in FIG. 4 and described herein. For example, process 400 may be performed in a 4G network and/or a multi-RAT environment, and involve 4G network device, such as an eNB, an MME, an SGW/PGW, a PCRF, etc.

According to an exemplary embodiment, a RAN communicates local bandwidth conditions based on the RAN's determination of RF band combinations instead of the core network making interpretations of RF band combinations. According to an exemplary implementation, the RAN may communicate local RF bandwidth information at the flow or bearer level of granularity. According to an exemplary implementation, the RAN may communicate local bandwidth information at the same time of sending RRC reconfiguration to the UE device or with other messages that may be exchanged during an attachment procedure and/or other procedures that may involve the core network (e.g., PDU session management, UE context management, UE mobility management, etc.).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Figure 5:
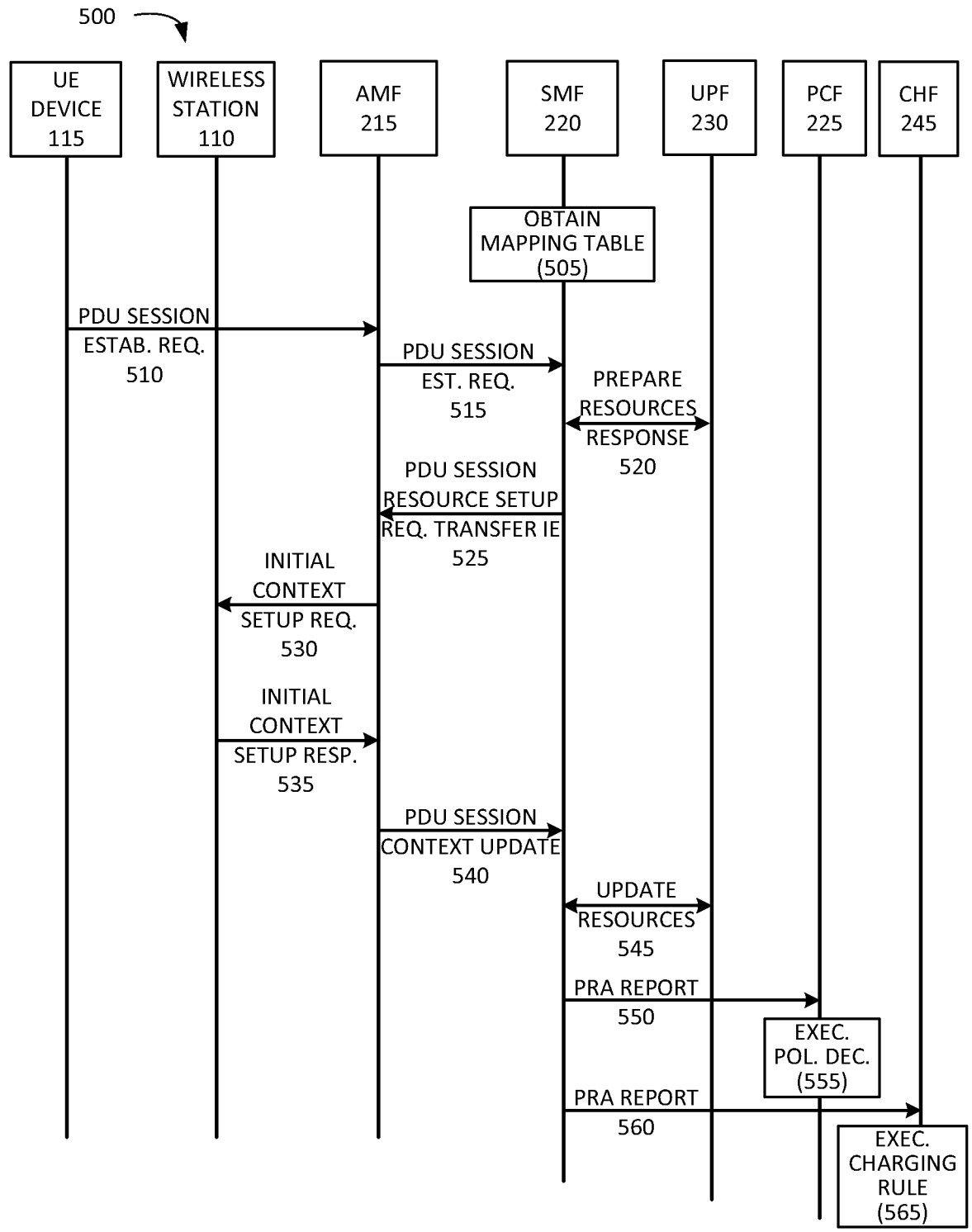
FIG. 5 is a messaging and operations diagram illustrating an exemplary embodiment of the encoding of tunnel messaging system.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   sending, by a radio access network (RAN) to a core network device, a first general packet radio service (GPRS)-tunnel endpoint identifier (GTP-TEID) that identifies first radio frequency (RF) bandwidths supporting a first dedicated radio bearer (DRB) in the RAN, wherein multiple presence reporting areas (PRAs) define a coverage area within the RAN;
   mapping an RF bandwidth category level to each PRA, wherein the RF bandwidth category levels include multiple values that differ;
   notifying, by the core network device, other core network devices of a first RF bandwidth category level corresponding to the first RF bandwidths; and
   applying, by the other core network devices, at least one of a first traffic shaping policy or a first charging rule to the first DRB based on the first RF bandwidth category level.

2. The method of claim 1, further comprising:
   sending, to the core network device, a second GTP-TEID that identifies second RF bandwidths supporting a second DRB in the RAN, wherein the second RF bandwidths differ from the first RF bandwidths;
   notifying other core network devices of a second RF bandwidth category level corresponding to the second RF bandwidths; and
   applying at least one of a second traffic shaping policy or a second charging rule to the second DRB based on the second RF bandwidth category level.

3. The method of claim 2, further comprising:
   encoding the first GTP-TEID with a first extension identifying a first local radio environment (LRE); and
   encoding the second GTP-TEID with a second extension identifying a second LRE.

4. The method of claim 3, further comprising:
   analyzing the first LRE and the second LRE; and
   generating, based on results of the analyzing, a first PRA and a second PRA.

5. The method of claim 1, wherein the other core network devices comprise a policy control function (PCF) device and a charging function (CHF) device.

6. The method of claim 1, further comprising:
   selecting at least one of quality of service (QoS), a network slice identifier, charging, traffic management, data shaping, or other policies based on a first PRA and a second PRA.

7. The method of claim 1, wherein the core network device comprises a session management function (SMF) device.

8. A system comprising:
   at least one radio access network (RAN) device comprising a processor, wherein the at least one RAN device is configured to:
   send, to a core network device, a first general packet radio service (GPRS)-tunnel endpoint identifier (GTP-TEID) that identifies first radio frequency (RF) bandwidths supporting a first dedicated radio bearer (DRB) in a RAN, wherein multiple presence reporting areas (PRAs) define a coverage area within the RAN;
   map an RF bandwidth category level to each PRA, wherein the RF bandwidth category levels include multiple values that differ;
   notify other core network devices of a first RF bandwidth category level corresponding to the first RF bandwidths; and
   direct the other core network devices to apply at least one of a first traffic shaping policy or a first charging rule to the first DRB based on the first RF bandwidth category level.

9. The system of claim 8, wherein the at least one RAN device is further configured to:
   send, to the core network device, a second GTP-TEID that identifies second RF bandwidths supporting a second DRB in the RAN, wherein the second RF bandwidths differ from the first RF bandwidths;
   notify other core network devices of a second RF bandwidth category level corresponding to the second RF bandwidths; and
   apply at least one of a second traffic shaping policy or a second charging rule to the second DRB based on the second RF bandwidth category level.

10. The system of claim 8, wherein the at least one RAN device is further configured to:
    encode the first GTP-TEID with a first extension identifying a first local radio environment (LRE); and
    encode the second GTP-TEID with a second extension identifying a second LRE.

11. The system of claim 10, wherein the at least one RAN device is further configured to:
    analyze the first LRE and the second LRE; and
    generate, based on results of the analyzing, a first PRA and a second PRA.

12. The system of claim 8, wherein the other core network devices comprise a policy control function (PCF) device and a charging function (CHF) device.

13. The system of claim 8, wherein the at least one RAN device is further configured to:
    select at least one of quality of service (QoS), a network slice identifier, charging, traffic management, data shaping, or other policies based on a first PRA and a second PRA.

14. The system of claim 8, wherein the core network device comprises a session management function (SMF) device.

15. A non-transitory computer-readable storage medium storing instructions executable by a processor of a radio access network (RAN) device, which when executed cause the RAN device to:
- send, to a core network device, a first general packet radio service (GPRS)-tunnel endpoint identifier (GTP-TEID) that identifies first radio frequency (RF) bandwidths supporting a first dedicated radio bearer (DRB) in a RAN, wherein multiple presence reporting areas (PRAs) define a coverage area within the RAN;
- map an RF bandwidth category level to each PRA, wherein the RF bandwidth category levels include multiple values that differ;
- notify other core network devices of a first RF bandwidth category level corresponding to the first RF bandwidths; and
- direct the other core network devices to apply at least one of a first traffic shaping policy or a first charging rule to the first DRB based on the first RF bandwidth category level.

16. The non-transitory computer-readable storage medium of claim 15, wherein the instructions further cause the RAN device to:
- send, to the core network device, a second GTP-TEID that identifies second RF bandwidths supporting a second DRB in the RAN, wherein the second RF bandwidths differ from the first RF bandwidths;
- notify other core network devices of a second RF bandwidth category level corresponding to the second RF bandwidths; and
- apply at least one of a second traffic shaping policy or a second charging rule to the second DRB based on the second RF bandwidth category level.

17. The non-transitory computer-readable storage medium of claim 16, wherein the instructions further cause the RAN device to:
- encode the first GTP-TEID with a first extension identifying a first local radio environment (LRE); and
- encode the second GTP-TEID with a second extension identifying a second LRE.

18. The non-transitory computer-readable storage medium of claim 17, wherein the instructions further cause the RAN device to:
- analyze the first LRE and the second LRE; and
- generate, based on results of the analyzing, a first PRA and a second PRA.

19. The non-transitory computer-readable storage medium of claim 15, wherein the other core network devices comprise a policy control function (PCF) device and a charging function (CHF) device.

20. The non-transitory computer-readable storage medium of claim 15, wherein the instructions further cause the RAN device to:
- select at least one of quality of service (QoS), a network slice identifier, charging, traffic management, data shaping, and/or other policies based on a first PRA and a second PRA.

* * * * *